United States Patent [19]

Rice

[11] Patent Number: 4,699,149
[45] Date of Patent: Oct. 13, 1987

[54] APPARATUS FOR THE IDENTIFICATION OF INDIVIDUALS

[76] Inventor: Joseph Rice, 126 Julian Road, West Bridgford, Nottingham NG2 5AN, England

[21] Appl. No.: 795,341
[22] PCT Filed: Mar. 19, 1985
[86] PCT No.: PCT/GB85/00127
§ 371 Date: Oct. 31, 1985
§ 102(e) Date: Oct. 31, 1985
[87] PCT Pub. No.: WO85/04088
PCT Pub. Date: Sep. 26, 1985

[30] Foreign Application Priority Data

Mar. 20, 1984 [GB] United Kingdom ............... 8407249
May 15, 1984 [GB] United Kingdom ............... 8412407
Jan. 25, 1985 [GB] United Kingdom ............... 8501939

[51] Int. Cl.⁴ .............................................. A61B 5/00
[52] U.S. Cl. ....................................... 128/664; 382/2
[58] Field of Search ............. 128/633, 653, 664, 665, 128/666, 687; 382/2, 65

[56] References Cited

U.S. PATENT DOCUMENTS

| | | | |
|---|---|---|---|
| 3,639,905 | 2/1972 | Yaida et al. ........................ | 382/2 |
| 4,032,889 | 6/1977 | Nassimbene. | |
| 4,301,808 | 11/1981 | Taus ................................... | 128/687 |
| 4,393,366 | 7/1983 | Hill ..................................... | 382/2 |
| 4,473,081 | 9/1984 | Dioguardi et al. ................ | 128/670 |
| 4,489,731 | 12/1984 | Baumberg ........................ | 128/687 |
| 4,545,387 | 10/1985 | Balique ............................. | 128/664 |
| 4,565,968 | 1/1986 | Macovski ......................... | 128/653 |

FOREIGN PATENT DOCUMENTS 0061832 10/1982 European Pat. Off. .
197806 6/1978 Switzerland ....................... 128/666

OTHER PUBLICATIONS

Schlager, "A New Infrared Array Radiometer with Automatic Pattern Recognition for Medical Thermography", Eighth Annual Northeast Bioengineering Conference Mar. 27-28, 1980, pp. 227-232.
Eye Identify Inc., Product Data Sheet, 1-1985.

Primary Examiner—Henry J. Recla
Assistant Examiner—Ruth S. Smith
Attorney, Agent, or Firm—Cushman, Darby & Cushman

[57] ABSTRACT

The arrangement of veins is a unique characteristic of an individual. Identification is performed by means of a detector (9) which scans a region of the skin (6) and detects the position of subcutaneous blood vessels (8) by measurement of a parameter such as the reflection of incident radiation. Comparison of the measured pattern with a predetermined pattern provides identification of the individual.

5 Claims, 4 Drawing Figures

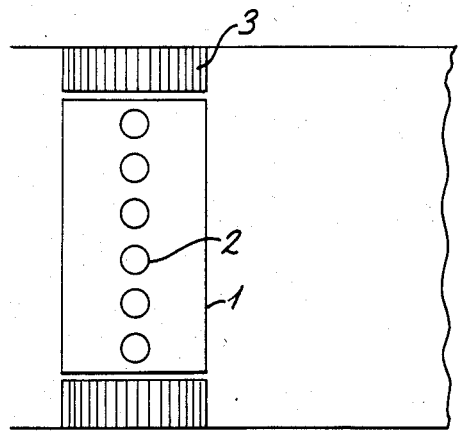
Fig. 1
Fig. 2
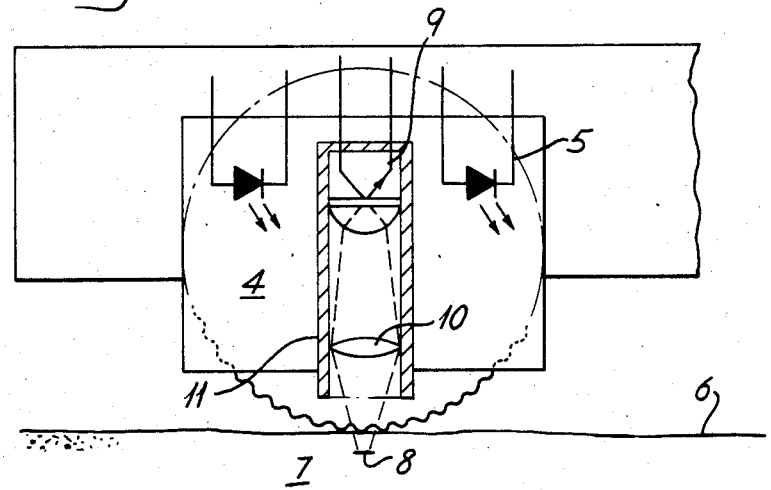

APPARATUS FOR THE IDENTIFICATION OF INDIVIDUALS

This invention relates to devices for the identification of individuals and finds particular application in instances where access is required to be restricted such as credit or cash dispensing or admission to secure sites or the operation of sensitive machinery.

To restrict access to items such as bank accounts, authorized individuals are customarily issued with identity cards bearing a unique alphanumeric code. Usually these cards bear impressed characters; they may also, or alternatively, contain magnetically encoded data or alternatively optically encoded data in the form of thin films readable only with special optical apparatus. A difficulty with cards of this type is that they can become lost or stolen, or the encoded data may be easily copied. It is therefore desirable to devise some means of identification which is unique to an individual and which, preferably cannot be separated from them. One possibility is to make use of fingerprints, which are known to be characteristic of a particular person—even identical twins possess different patterns. However, sophisticated optical apparatus would be required as the patterns are extremely fine.

In another personal identification system, described in U.S. Pat. No. 4,393,366, properties of the eye are used as a basis for recognition. Amongst the stable features contributing to a complex optical image are the number of retinal blood vessels and their relative angles and branching characteristics, the size of the optic disc, pigments or colouring patterns of the retina and the chloroidal vasculature. The method relies on the simplicity of optical access and the fact that the eye itself can form part of the optical system.

We have found that it is not necessary to rely on a means of identification which requires visual access to a characteristic of the human body. We have found that the pattern of subcutaneous blood vessels is characteristic of an individual, and that observation can be effected using radiation such as infra-red or thermal radiation to which the skin is translucent. If a sufficient intensity is employed, visible radiation in conjunction with appropriate filters may be used instead of infra-red radiation.

The location of blood vessels may be detected by differential temperature measurement. Alternatively, movement or the presence of blood can be detected by techniques such as nuclear magnetic resonance or acoustic monitoring of the pulse.

By subcutaneous is meant lying beneath the skin and not accessible to normal visual observations.

According to the present invention there is provided apparatus for identifying an individual comprising means for detecting the arrangement of a network of subcutaneous blood vessels and comparator means for comparing said arrangement with a predetermined pattern.

An embodiment of the invention will now be described by way of example with reference to the accompanying drawings, in which:

FIG. 1 shows a plan view of the underneath of a scanning device used for the identification of individuals.

FIG. 2 shows in section, details of the construction of one element of the scanning device.

Figure 3:
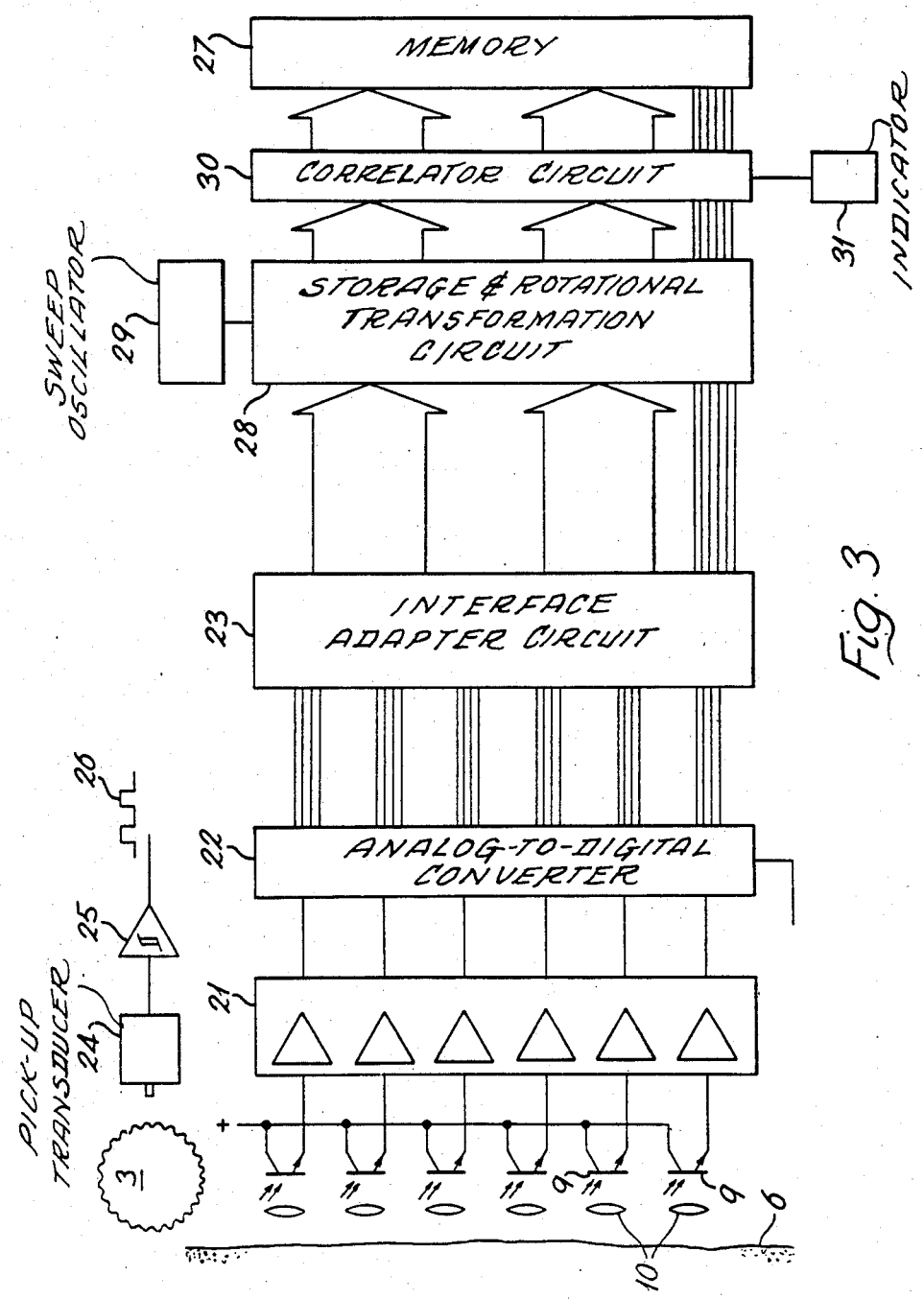
FIG. 3 is a block diagram of part of a circuit used in association with the scanner of FIG. 1

Referring now to FIG. 1 of the drawings, a carrier 1 has mounted thereon a plurality of scanning elements 2. Rotatably mounted on the block is a pair of encoder wheels 3. FIG. 2 illustrates a section through a single scanning element. This comprises a translucent block 4 in which are encapsulated infra-red radiation emitting diodes 5. The block acts as a radiation integrater and floods the adjacent surface of the skin 6 of an individual under test with infra-red radiation. The skin is transparent to the radiation which penetrates into and illuminates the subcutaneous region 7. The radiation is reflected by subcutaneous blood vessels 8 and is received by a photosensitive pin diode 9 which detects radiation reflected from the subcutaneous layer including the blood vessels and is sensitive to differences in intensity of the reflected radiation. A lens 10 and aperture restricting tubular stop 11 limit the area of the region from which radiation is received at any given instant.

The electronic circuit for processing the output signals from the pin diodes is shown in FIG. 3. The output signals from a plurality of diodes 9 are fed to a multiple amplifier 21 and thence to an analogue-to-digital converter 22. The parallel outputs are converted to four bit words by an interface adapter circuit 23. The encoder wheel 3 rotates adjacent to a pickup transducer 24 which feeds a bistable 25 to produce a train of READ pulses 26 as the carrier block 1 traverses the surface of the skin.

Figure 4:
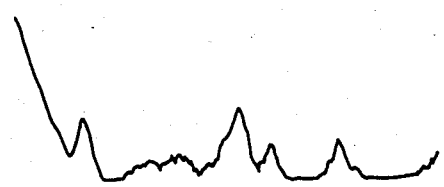
FIG. 4 is an example of several scans of an individual wrist using the apparatus of FIG. 1.
Figure 4:
Figure 4:
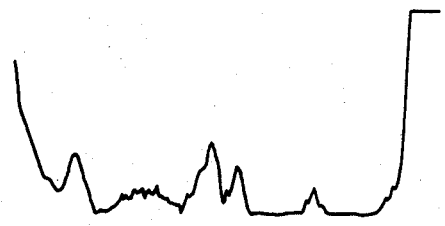
Figure 4:
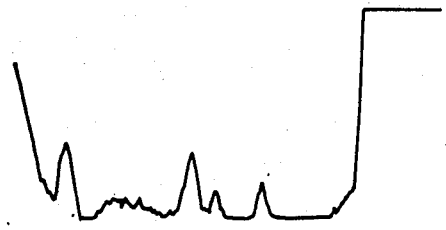

A typical output signal produced by a transducer prior to digitisation is shown in FIG. 4. This exhibits a series of peaks which are characteristic of a particular individual and correspond to the pattern of veins beneath the surface of the skin. Thus if a transducer is constrained to follow a predetermined path it will reproduce a pattern which can be recorded and correlated with the pattern produced on subsequent traverses of the same path. By using a detector with a plurality of transducers, a matrix of readings may be obtained. These are stored as a block of words in memory 27. The outputs from the interface adapter are fed to a storage and rotational transformation circuit 28 which stores the scanner readings as a two-dimensional array. Under the control of a sweep oscillator 29, the transformation circuit performs rotational transforms on the array, to take account of the fact that the subsequent scan may not have been parallel to the original calibration scan. The scan signal is compared with the calibration signal by a correlator circuit 30 which provides an output to an indicator 31 when a desired level of match is attained. The memory holding the reference signal is in the form of a ring counter which is clocked at a rate significantly higher than the rate of rotational transformation to take account of possible lateral displacement of the scanning head.

The scanning and monitoring circuits may be incorporated in a static monitoring device which can be strapped to an individual's wrist to authenticate his identity.

By incorporating a transponder, the device may be used for remote identification in the following manner. On entering a secure area or before performing a secure operation the device is interrogated by a remote transmitter. If the desired signal is present at the output of the correlator, then the transponder sends back a verification signal.

The monitoring device may incorporate environmental monitoring circuits to establish the continued presence of the device on the user's wrist. If the device is removed, the transponder is deactivated until a predetermined security code is entered into priming circuits within the monitor. Additional environmental monitoring may establish that the wearer's pulse rate, pulse profile, skin resistance or wrist vein pattern conform either to known norms or to the individual's characteristics which are pre-entered into secure memory locations in the device.

The device finds particular application in credit transactions. It can also be used in other applications such as locks for preventing access to secure areas or for prevention of operation of weapons systems. In particular, a vein pattern recognition device may be mounted on, for example, a gun but to prevent operation other than by an authorised individual.

I claim:

1. An apparatus for identifying an individual comprising:

radiation source means adapted to illuminate a region of the skin of an individual which is substantially opaque to visible radiation but substantially transparent to radiation from said source, means for detecting radiation from said source means reflected from the individual and sensitive to lateral variations and intensities of said reflected radiation so as to detect the arrangement of subcutaneous blood vessels in said region of the skin, wherein said means for detecting includes transducer means for generating a signal indicative of the variation of the arrangement of subcutaneous blood vessels; and comparator means for comparing said signal with a reference signal characteristic of the individual.

2. An apparatus for identifying an individual as claimed in claim 1, wherein the means for detecting the arrangement of subcutaneous blood vessels comprises means adapted to move laterally whereby an area of the skin of said individual can be scanned.

3. An apparatus for identifying an individual as claimed in claim 2, wherein said transducer means comprises a plurality of radiation detectors arranged substantially normal to said lateral direction of movement.

4. An apparatus for identifying an individual as claimed in claim 1, wherein said source of radiation includes integrator means to flood the region of surface of the skin adjacent the transducer means with radiation.

5. An apparatus for identifying an individual as claimed in claim 1, wherein said source of radiation is a source of infra-red radiation.

* * * * *